United States Patent
Yang

(10) Patent No.: US 6,342,170 B1
(45) Date of Patent: Jan. 29, 2002

(54) FABRICATION METHOD AND FORMING MOLD FOR MULTI-FIBER OPTICAL-CONNECTOR FERRULES

(75) Inventor: Hsi-Harng Yang, ChangHua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/323,761

(22) Filed: Jun. 1, 1999

(30) Foreign Application Priority Data

Mar. 5, 1999 (TW) .......................................... 88103351

(51) Int. Cl.⁷ .............................................. B29D 11/00
(52) U.S. Cl. ..................... 264/1.25; 264/1.27; 264/2.5; 425/174.4; 425/468; 425/577
(58) Field of Search ................................. 264/1.1, 1.25, 264/2.5, 400, 1.27, 1.36, 1.37, 219; 425/577, 468, 174.4; 249/64, 177

(56) References Cited

U.S. PATENT DOCUMENTS

| 5,602,955 A | * | 2/1997 | Haake |
| 5,611,011 A | * | 3/1997 | Morlion et al. |
| 5,780,079 A | * | 7/1998 | Lee .......................... 264/1.25 |
| 5,786,002 A | * | 7/1998 | Dean et al. ................ 264/1.25 |
| 6,074,577 A | * | 6/2000 | Katsura et al. ............ 264/1.25 |

* cited by examiner

Primary Examiner—Mathieu D. Vargot
(74) Attorney, Agent, or Firm—W. Wayne Liauh

(57) ABSTRACT

A fabrication method and forming mold for multi-fiber optical connector ferrules uses X-ray LIGA technology to integrally form a plurality of fiber bores and guide bores in an aligning mold in an array manner with great precision of bores size and alignment positions. Then a plurality of fiber pins and guide pins are engaged with the fiber bores and guide bores to form the mold core. The mold core is then housed between a pair of side walls and an upper mold and a lower mold for injection molding process. The ferrules thus may be produced with great precision.

17 Claims, 4 Drawing Sheets

FABRICATION METHOD AND FORMING MOLD FOR MULTI-FIBER OPTICAL-CONNECTOR FERRULES

BACKGROUND OF THE INVENTION

1. Field of the Invention

This invention relates to fabrication method and forming mold for multi-fiber optical connector ferrules and particularly to multi-fiber optical connector ferrules that are being produced by means of an aligning mold which has high precision array fiber bores and guide pins laid in an array manner.

2. Description of the Prior Art

Optical fiber has been widely used as a high speed and high capacity communication medium nowadays. Besides for replacing conventional copper-based wire for telephone use, it is particularly desirable for data and image transmission. In optical fiber systems, fiber connector ferrules are essential components for connecting optical fibers. As an optical fiber is a fine and high precision material, making fiber connector ferrule also needs high precision machining process. It takes a lot of micro electromechanical operation to fabricate the fiber connector ferrule.

There are many micro electromechanical fabrication techniques have been developed for producing miniature and high precision components. FIG. 1 illustrates a technique disclosed in U.S. Pat. No. 5,214,730 for a multi-fiber optical connector ferrules module. It mainly includes an upper mold engagement with a lower mold 9 which has a plurality of V-shaped grooves. A plurality of fiber bore forming pins 7 are located in V-shaped grooves for forming fiber bores while a pair of guide bore forming pins 8 are located respectively in another two V-shaped grooves at two lateral sides for forming guide bores.

This technique has the following disadvantages:

1. The fiber bores tend to drift upward during molding process. As a result, the fiber cannot align accurately with the fiber bore when the fiber connector ferrules are produced.
2. The two slant walls of the V-shaped groove will be torn and worn after repetitive fiber movement in the fiber connector ferrule. It will result in not accurate alignment of fiber bore forming pins.
3. The V-shaped grooves are made by mechanical pressing process. It has structural restriction and cannot enhance fiber bore accuracy to a desirable degree.

In order to resolve the problems set forth above, there is another technique being introduced. U.S. Pat. No. 5,786,002 is such an example as shown in FIG. 2. It is called "Guide Block Assembly For aligning Bore Forming Pins During Molding of Multi-Fiber Optical Connector Ferrules". It has an assembly 10 which includes a plurality of fiber bore blocks 22a–h. Each of the blocks has a fiber bore 32a–h for holding a fiber pin 30 therein. There are a pair of guide bore blocks 24a–b located at two lateral sides. Each of the guide bore blocks 24a–b may hold a guide pin 33. While the technique resolves the V-shaped groove wearing problem set forth above, the guide bore blocks should be made by machining one by one and may result in not accuracy of the fiber bores and their aligning positions.

Moreover conventional micro electromechanical process generally can process only materials of relatively soft property. The molds being used for fabricating the optical connector ferrules have high hardness. Conventional micro electromechanical technique thus is not an efficient process for producing the molds needed.

SUMMARY OF THE INVENTION

In view of aforesaid disadvantages, it is therefore an object of this invention to provide a fabrication method and forming mold for multi-fiber optical connector ferrules that uses an integrated mold to obtain high degree of bore accuracy and bores alignment. The diameter of the connector ferrules may be controlled through different fiber mold cores during molding material forming process. The fiber mold core may be made by grinding operation to achieve great precision.

It is another object of this invention to provide a fabrication method and forming mold for multi-fiber optical connector ferrules that uses X-ray LIGA technology to fabricate the mold for obtaining accurate fiber bores and bores alignment.

The mold according to one aspect of this invention includes an aligning mold and two spaced side walls to form a U-shaped member and a middle wall to engage with the side walls to form a rectangular frame. There are a plurality of fiber pins mounted on the middle wall engagement with a plurality of fiber bores formed in the aligning mold. There are also two spaced guide pins on the middle wall engagement with two spaced guide bores formed in the aligning mold. The fiber bores and the guide bores are integrated formed and thus may be made with great precision either for the bore sizes and for their alignment positions.

According to another aspect of this invention, the aligning mold is supported by a substrate. There is an upper mold and a lower mold to cover the rectangular frame between the aligning mold and the middle wall to form a closed mold cavity for forming the fiber connector ferrules.

There are support blocks mounted on the middle wall to hold the fiber pins firmly. The middle wall further has a funnel type inlet to receive molding material into the mold cavity. The guide pins are larger size than the bore pins for holding the mold firmly with adequate strength. The fiber bores and the guide bores are made by X-ray LIGA technology to obtain high precision of bores and alignment positions. The mold core (i.e., the fiber pins) is made by grinding.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

This invention employs X-ray LIGA technology to produce a high precision aligning mold for fabricating multi-fiber optical connector ferrules. It includes to produce accurate fiber bores and bores intervals. The fiber bores and guide bores are integrally formed in the aligning mold in an array manner for forming the connector ferrules required. The fiber dimension is controlled by the mold core (i.e., fiber pins).

Figure 1:
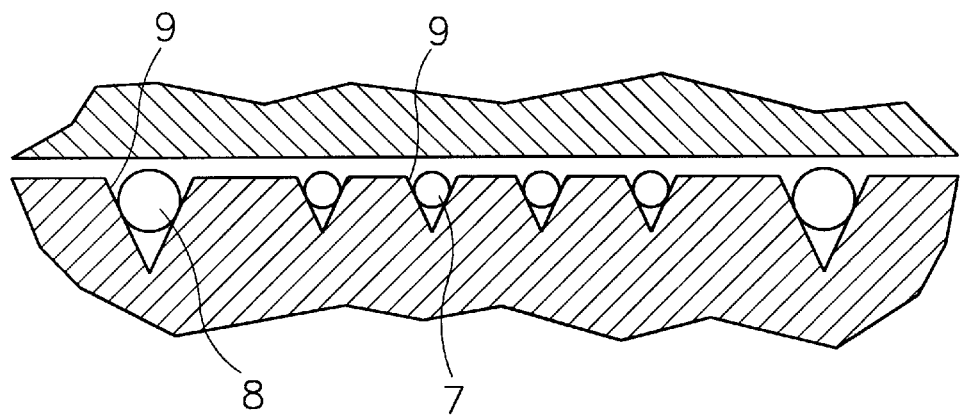
FIG. 1 is fragmentary sectional view of a conventional mold for multi-fiber optical connector ferrules disclosed by U.S. Pat. No. 5,214,730.
Figure 2:
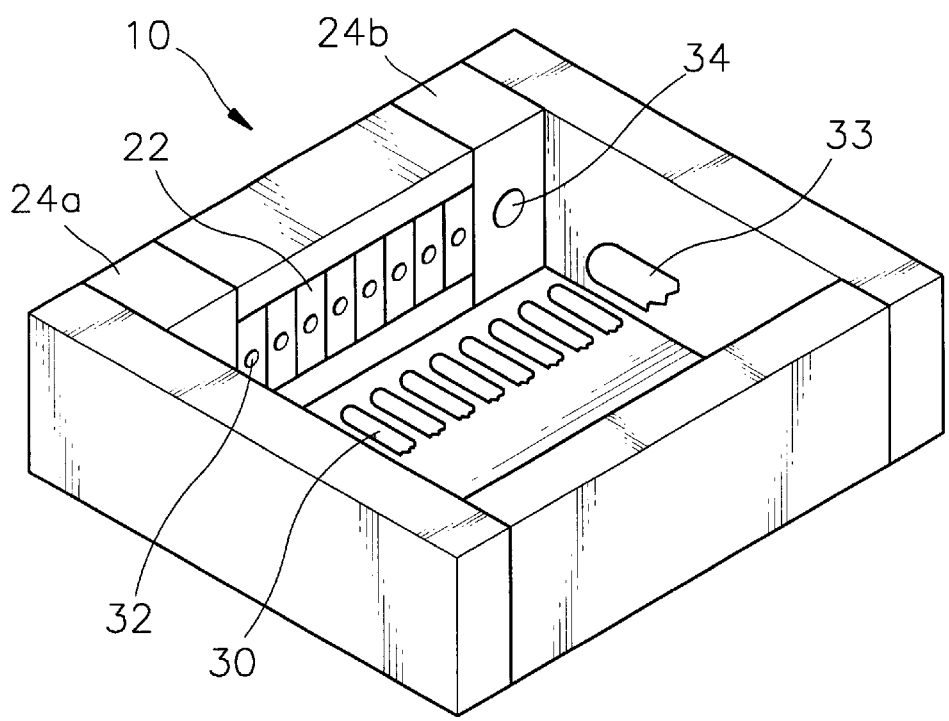
FIG. 2 is a perspective view of another conventional mold for multi-fiber optical connector ferrules disclosed by U.S. Pat. No. 5,786,002.
Figure 3:
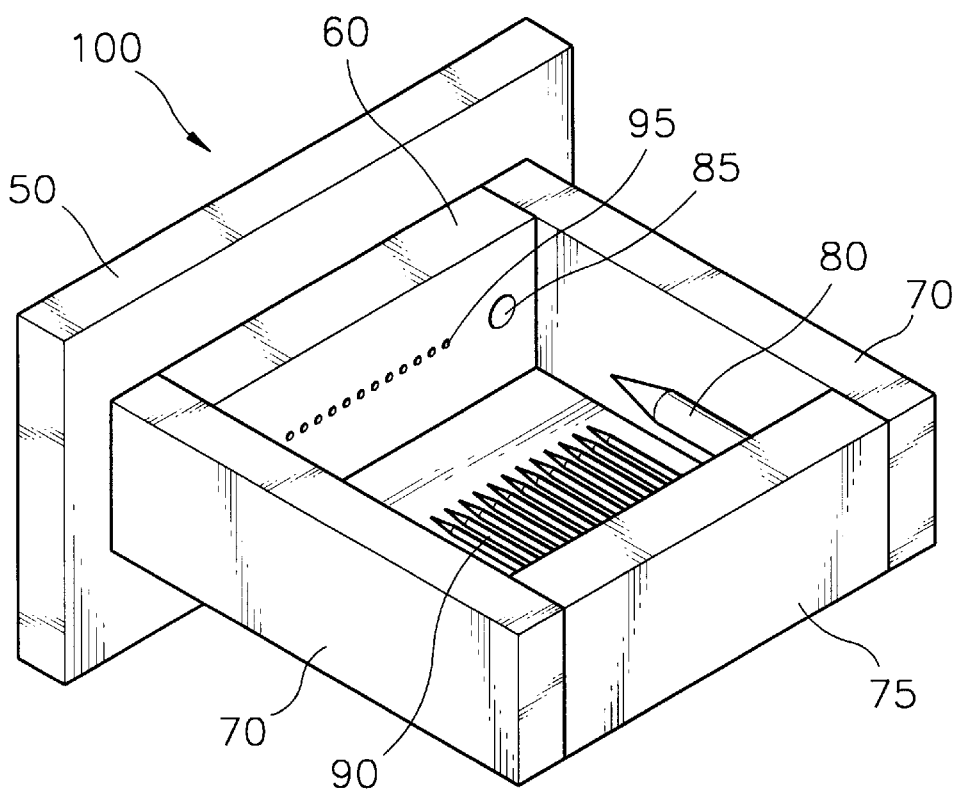
FIG. 3 is a perspective view of a mold for multi-fiber optical connector ferrules of this invention.
Figure 4:
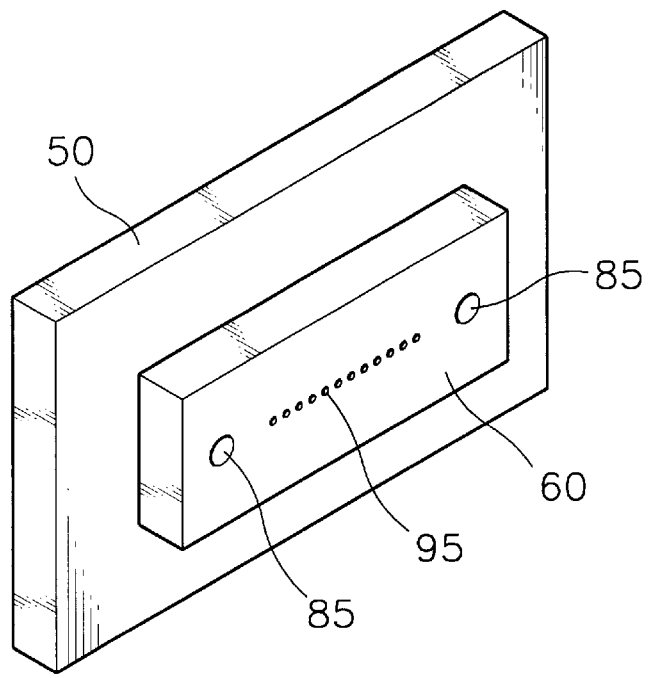
FIG. 4 is a perspective view of an aligning mold made by X-ray LIGA technique.
Figure 5:
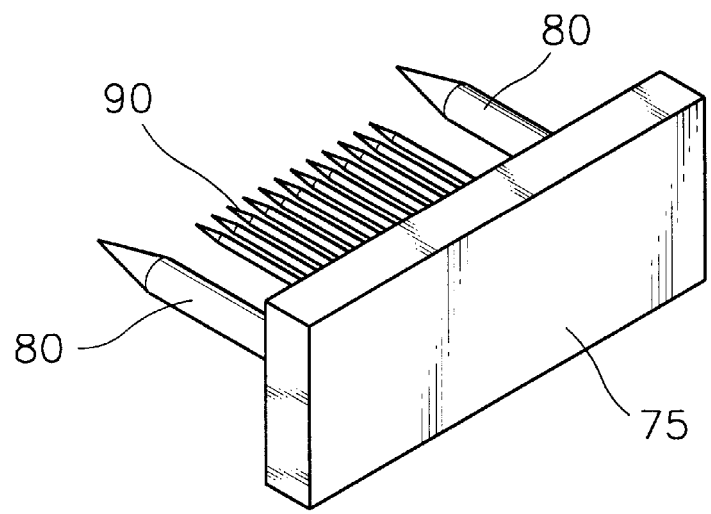
FIG. 5 is a perspective view of a mold core (fiber pins) and guide pins of this invention.

Referring to FIGS. 3,4 and 5, the fiber ferrules forming mold 100 according to this invention includes an aligning mold 60 sandwiched between a pair of side walls 70 at one end thereof. There is a middle wall 75 sandwiched between the side walls 70 at another end thereof to form a rectangular frame with the aligning mold 60. In the aligning mold 60, there are a plurality of fiber bores 95 arranged in an array manner. Each of the fiber bores 95 has a diameter of about 26 μm. There are also two guide bores 85 formed in the aligning mold 60 at two ends beyond the fiber bores 95. The guide bores 85 have larger diameter than the fiber bores 95 for supporting and positioning of the mold. Both the fiber bores 95 and the guide bores 85 are made integrally by means of X-ray LIGA technology to get accurate bore size and alignment positions. The X-ray LIGA technology is known in the art and will be omitted here. The aligning mold 60 is mounted on a substrate 50.

On the middle wall 75, there are a plurality of fiber pins 90 and a pair of guide pins 80 engagement respectively with the fiber bores 95 and guide bores 85. The fiber pins 90 serve as mold core and are made by grinding process, and they are mounted on the middle wall 75 and supported by a pair of holding blocks 110 at the upper and lower side (shown in FIG. 7).

Figure 6:
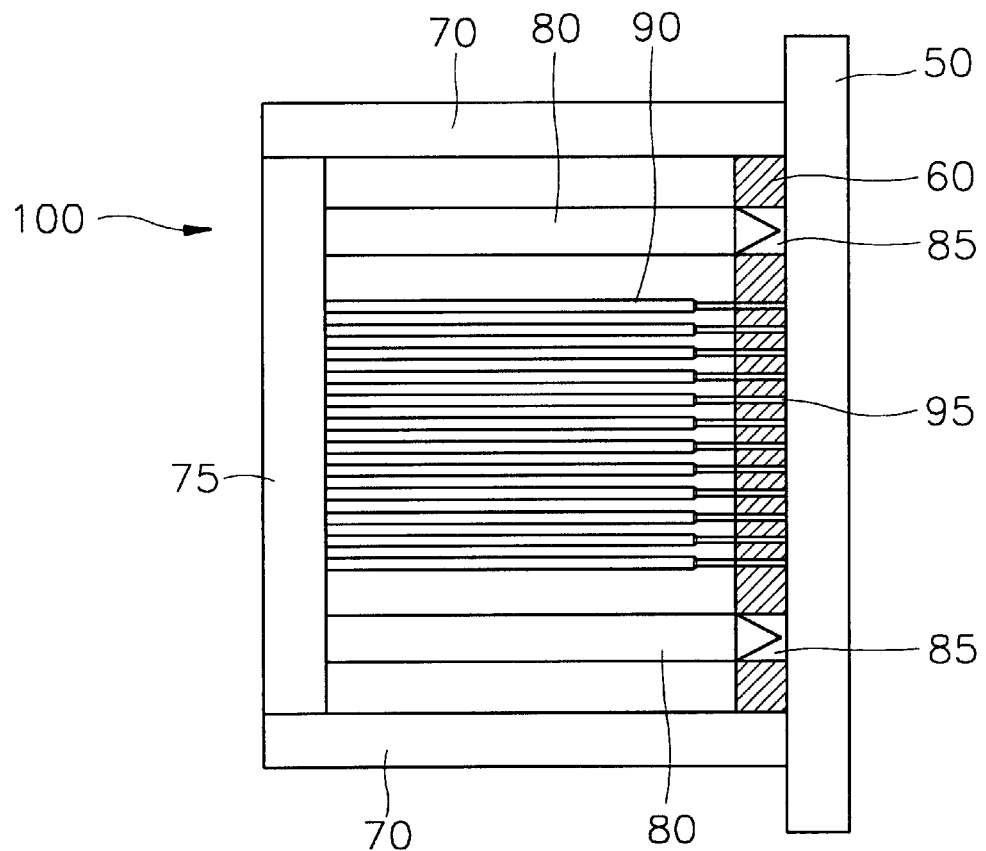
FIG. 6 is a top view of a mold assembly of this invention.

FIG. 6 shows the mold of this invention in a set up state. The guide pins 80 engage with the guide bores 85 to hold the middle wall 75 firmly against the aligning mold 60. The fiber pins 90 then maybe engaged with the fiber bores 95 securely and accurately.

Figure 7:
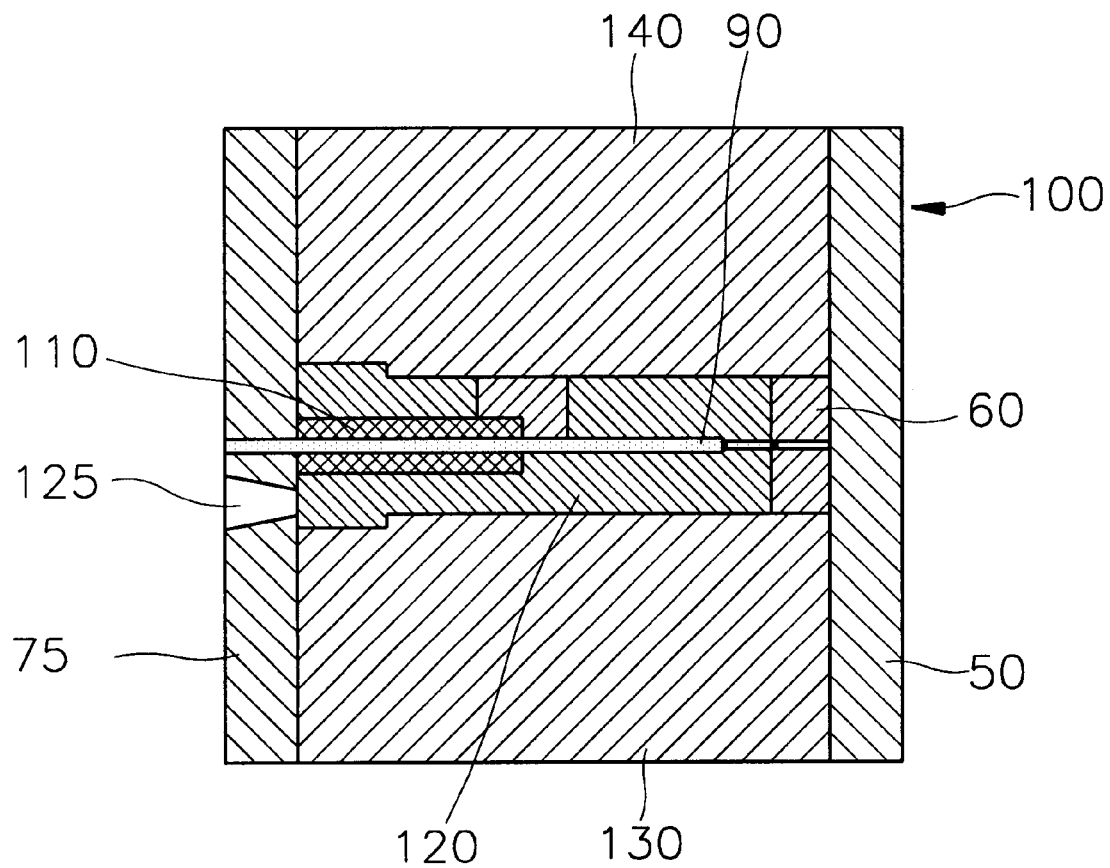
FIG. 7 is a sectional view of a completed mold assembly of this invention.

Referring to FIG. 7, there is further an upper mold 140 and a lower mold 130 disposed respectively above and below the fiber pins 90 to form a fiber ferrules cavity 120 there between. The middle wall 75 further has a funnel type inlet 125 to receive molding material which is preferably a polymer material such as plastics or rubber. The fiber connector ferrules then may be formed in the cavity with the fiber pins 90 as mold cores.

As the fiber pins 90 are formed by grinding, their dimension may be made with great accuracy. The fiber bores 95 are formed by X-ray LIGA technology with great precision either in their size and positions. Hence the mold may be made with high accuracy to produce high quality multi-fiber optical connector ferrules.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A forming mold for making multi-fiber optical connecter ferrules, comprising:
    a rectangular mold mounting in the central part of the forming mold, which includes an aligning mold which has a plurality of fiber bores and a plurality of guide bores integrally formed therein, a pair of spaced side walls sandwiching the aligning mold at two ends thereof;
    an upper mold located above the rectangular mold; and
    a lower mold located below the rectangular mold to form a mold cavity with the rectangular mold and the upper mold;
    wherein the fiber bores and the guide bores are integrally formed using an X-ray LIGA technology.

2. The forming mold for making multi-fiber optical connector ferrules of claim 1 further having a substrate engagement with the aligning mold.

3. The forming mold for making multi-fiber optical connector ferrules of claim 1 further having a middle wall opposite to and spaced from the aligning mold having a plurality of fiber pins engaged with the fiber bores and a plurality of guide pins engaged with the guide bores.

4. The forming mold for making multi-fiber optical connector ferrules of claim 1, wherein the fiber pins are held by a pair of holding blocks before mounting on the middle wall.

5. The forming mold for making multi-fiber optical connector ferrules of claim 1, wherein the middle wall further has a funnel type inlet for receiving molding material into the mold cavity.

6. The forming mold for making multi-fiber optical connector ferrules of claim 1, wherein the guide pins have larger diameter than the fiber pins.

7. The forming mold for making multi-fiber optical connector ferrules of claim 1, wherein the fiber pins are made by grinding.

8. An injection mold for making multi-fiber optical connecter ferrules, comprising an aligning mold which has a plurality of fiber bores and a plurality of guide bores integrally formed therein, a pair of spaced side walls sandwiching the aligning mold at two ends thereof, and a plurality of fiber pins engaged with the fiber bores and a plurality of guide pins engaged with the guide bores;
    wherein the fiber bores and the guide bores are integrally formed using an X-ray LIGA technology.

9. The injection mold for making multi-fiber optical connector ferrules of claim 8 further having a substrate engagement with the aligning mold.

10. The injection mold for making multi-fiber optical connector ferrules of claim 8 further having a middle wall opposite to and spaced from the aligning mold having a plurality of fiber pins engaged with the fiber bores and a plurality of guide pins engaged with the guide bores.

11. The injection mold for making multi-fiber optical connector ferrules of claim 8, wherein the fiber pins are held by a pair of holding blocks before mounting on the middle wall.

12. The injection mold for making multi-fiber optical connector ferrules of claim 8, therein the guide pins have larger diameter than the fiber pins.

13. The injection mold for making multi-fiber optical connector ferrules of claim 8, wherein the fiber pins are made by grinding.

14. A method for fabricating multi-fiber optical connecter ferrules, comprising the steps of:
    (a) using X-ray LIGA technology to integrally produce a plurality of fiber bores and a plurality of guide bores in an aligning mold;
    (b) mounting the aligning mold on one side of a substrate;
    (c) disposing a plurality of fiber pins and a plurality of guide pins on a middle wall;
    (d) engaging the fiber pins and guide pins respectively with the fiber bores and guide bores in the aligning mold;

(e) engaging the aligning mold and the middle wall with two spaced side walls to form a rectangular frame;

(f) placing an upper mold and a lower mold respectively above and under the rectangular frame to form a closed mold cavity therein;

(g) forming a funnel type inlet in the middle wall for communicating with the mold cavity;

(h) injecting polymer material into the mold cavity through the inlet; and (i) disassembling the fiber pins and the guide pins.

15. The method for fabricating multi-fiber optical connector ferrules of claim 14, wherein the fiber bores and the guide bores in the aligning mold are integrally formed.

16. The method for fabricating multi-fiber optical connector ferrules of claim 14, wherein the polymer material is plastics or rubber.

17. The method for fabricating multi-fiber optical connector ferrules of claim 14, wherein the fiber pins are held by a pair of holding blocks before engaging with the aligning mold.

* * * * *